United States Patent Office 3,423,628
Patented Jan. 21, 1969

3,423,628
DELAY SWEEP FOR A SAMPLING OSCILLOSCOPE
Allan Irving Best, Colorado Springs, Colo., assignor to Hewlett-Packard Company, Palo Alto, Calif., a corporation of California
Filed Aug. 15, 1966, Ser. No. 572,598
U.S. Cl. 315—22    7 Claims
Int. Cl. H01j 29/70

ABSTRACT OF THE DISCLOSURE

A sampling oscilloscope having a slow sweep generator synchronized to the input signal, a reference source, and a voltage comparator, establishes a controlled delay period. A fast sweep time base generator is triggered either immediately following the end of the delay period or upon the occurrence of a selected event of the input signal following the end of the delay period. The fast sweep time base generator, a second reference source, and a second voltage comparator activate an input signal sampler, the sampled signal being displayed on a cathode ray tube.

---

This invention relates to sweep circuitry and utilization circuitry for a sampling oscilloscope.

It is often desirable to display a recurring waveform of an input signal on a sampling oscilloscope on a very fast time scale in order to observe a portion of the waveform in detail. When the waveform of the input signal under examination comprises a series of closely spaced events of short duration, such as a pulse train, expanding the time scale by conventional means in order to observe one event in greater detail is often hindered by the rate jitter of the input signal. Further, it is difficult to locate and identify a selected event after time scale expansion on a conventional sampling oscilloscope because expansion does not occur symmetrically about the selected event.

It is the principal object of the present invention to provide circuitry for a sampling oscilloscope which provides detailed and substantially jitter free displays on a cathode-ray display screen of selected events in the waveform of an input signal on a fast or expanded time scale.

It is another object of the present invention to provide a slower sweep which is synchronized to the input signal and which provides a delay interval at the end of which a fast or expanded sweep is started.

It is another object of the present invention to provide an adjustable delay interval prior to the start of the fast or expanded sweep.

It is still another object of the present invention to provide a fast or expanded sweep which may be synchronized at the end of a delay interval either to a slow sweep which is synchronized to the input signal or directly to a selected event on the waveform of the input signal.

In accordance with the illustrated embodiment of the present invention, a slow sweep is generated in synchronism with the input signal for providing accurately controlled time intervals after which a second sweep is produced to provide the time base for the cathode-ray tube display. This delayed sweep feature permits any portion of a complex signal or pulse train to be examined in detail on very fast time scales. In addition, the faster sweep may be started at the end of the delay interval generated by the slower sweep, either automatically (delayed trigger mode) or externally by the input signal (delayed armed mode). In the delayed trigger mode the faster sweep is immediately triggered automatically at the end of the delay interval, thereby permitting accurate measurements of any rate jitter associated with input signal. In the delayed armed mode the faster sweep is armed at the end of the delay interval thereby permitting the input signal to trigger the faster sweep. Thus, any rate jitter associated with the input signal is effectively eliminated from the display.

Figure 1:
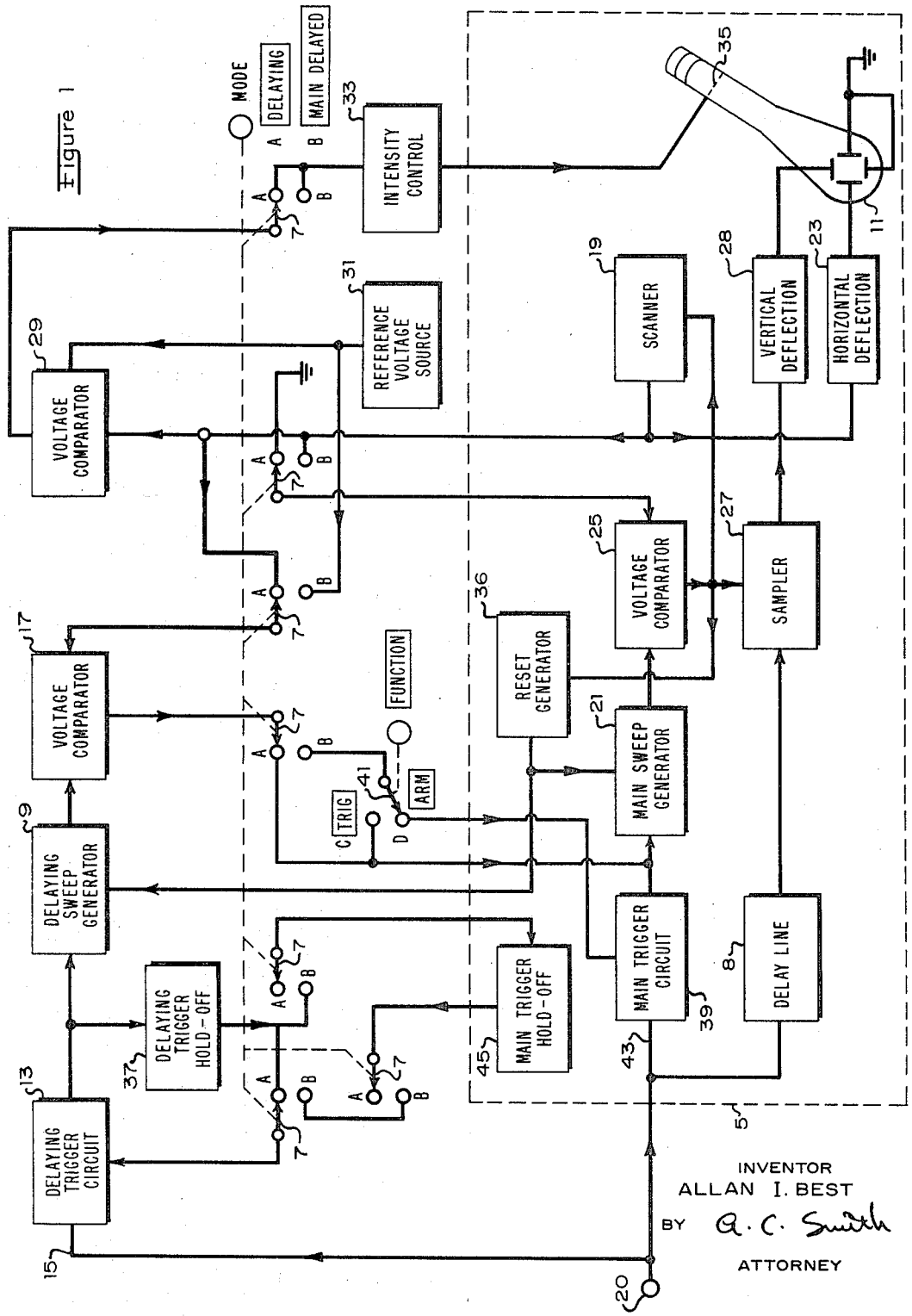

Other and incidental objects of the present invention will be apparent from a reading of this specification and an inspection of the accompanying drawing in which:

FIGURE 1 is a schematic diagram of the circuit of the present invention; and

FIGURES 2, 3 and 4a–g are graphs of signal waveforms in the circuit of FIGURE 1 operating, respectively, in the Delaying Sweep mode, the Delayed Triggered Sweep mode, and Delayed Armed Sweep mode.

Referring now to the circuit diagram of FIGURE 1, the circuit blocks and signal paths which comprise a conventional sampling oscilloscope are designated generally as 5. Switch 7 and the associated additional circuit blocks and signal paths select circuit operation either in the delaying sweep mode or in the main sweep delayed mode and switch 41 and its associated circuit blocks and signal paths select circuit operation either in the automatic sweep trigger function or in the armed sweep function when switch 7 is set to the main sweep delayed mode. The input signal at terminal 20 is applied through delay line 8 to the sampler 27 where sample pulses of the input signal are produced at selected instants, which sample pulses are then applied through the vertical deflection circuitry 28 to the vertical deflection electrodes of cathode-ray display tube 11. Delay line 8 enables a sweep to be initiated before the input signal (or samples thereof) appears on the vertical deflection electrodes of the CRT 11. The selected instants at which sampler 27 samples the input signal are thus determined by the circuitry of the present invention operating in any one of the modes and functions described herein.

Delaying sweep operating mode

Figure 2:
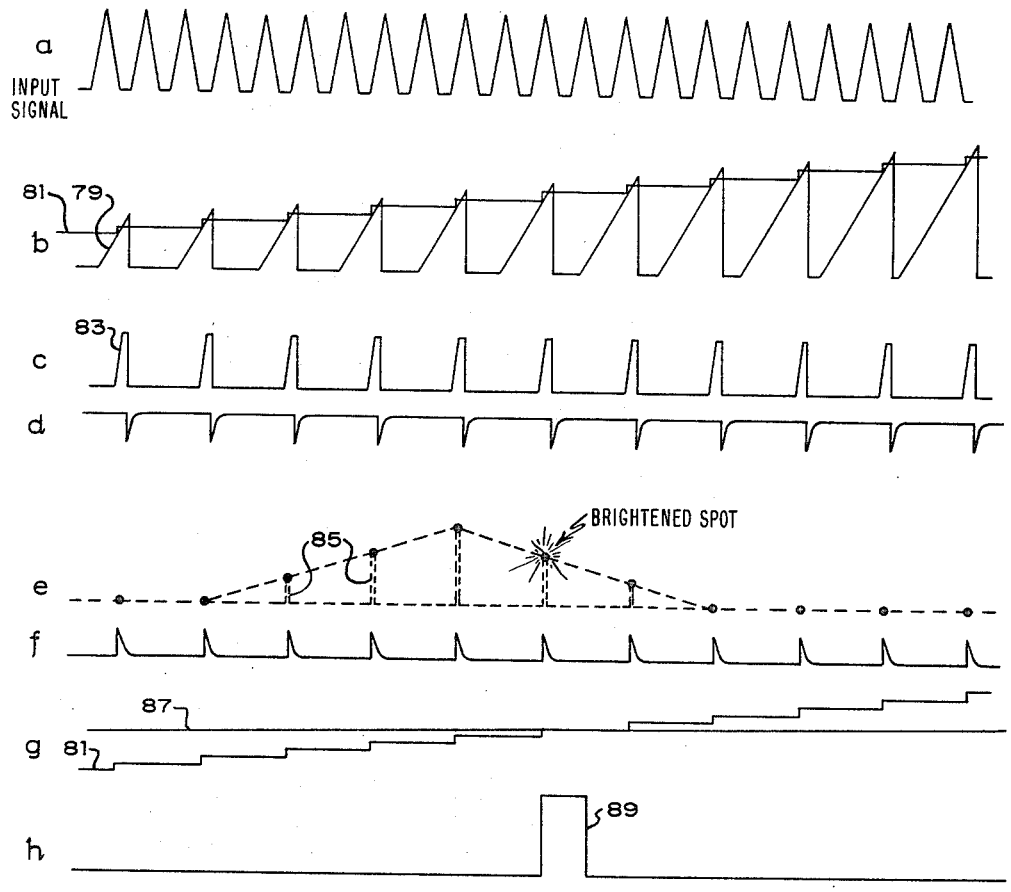

Referring to the circuit diagram of FIGURE 1 and to the graph of FIGURE 2, switch 7 is set to position A as shown to establish the horizontal axis time scale on the cathode-ray display tube 11 as follows: the delaying sweep generator 9 is triggered by the delaying trigger circuit 13 to provide a slow sweep 79 in response to the input signal at terminal 15. Voltage comparator 17 receives the signal 79 from delaying sweep generator 9 on one input and receives on the other input a scanning signal 81, normally a staircase waveform, derived from the scanner 19. When the voltage levels of these two signals are equal, voltage comparator 17 triggers (83) main sweep generator 21 which applies a fast sweep signal such as 99 of FIGURE 3d to one input of another voltage comparator 25, the second input of which is connected to a reference potential, say ground. When the two input signals applied to voltage comparator 25 are equal, the voltage comparator 25 triggers the sampler 27 and triggers reset generator 36 (FIGURES 2e and 2f) which then resets both the main sweep generator 21 and the delaying sweep generator 9. The sampler 27 is rendered momentarily operative by the output of comparator 25 to produce a narrow pulse 85 having an amplitude related to the amplitude of the input signal on terminal 20 at the instant the sampler 27 is triggered into conduction. Samplers of this type are shown and described in the literature (see U.S. Patents 3,191,065, 3,191,072, issued on June 22, 1965, and U.S. Patent 3,011,129 issued on Nov. 28, 1961). The output of sampler 27 is connected to the vertical deflection circuit 28 which applies deflection signals to the vertical deflection plates of CRT 11. The horizontal deflection circuit 23 applies a deflection signal such as a staircase waveform derived from scanner 19 to the horizontal deflection plates of CRT 11 to produce the desired sample presentation of the input signal (FIGURE 2e). Scanner 19 may be of conventional design in which the output amplitude increases by a fixed increment for each sample taken. Thus the delay between a selected event in the input signal at terminal 20 and the instant at which sampler is rendered momentarily conductive is a function of the slope of the main sweep from generator 21. The insertion of this variable delay is necessary to make the signal path delays in the delaying sweep mode of operation identical to the signal path delays in the main sweep delayed mode of operation, later described. This insures that the position of a selected event in the displayed input signal waveform remains unchanged for operation of the present invention in either of the described operating modes.

The signal 81 from scanner 19 which is applied to one input of voltage comparator 17 and to the horizontal deflection circuit 23 is also applied to one input of voltage comparator 29. The other input of this comparator 29 is connected to receive a variable reference voltage 87 from source 31. When these voltages are equal, comparator 29 triggers intensity control 33 which momentarily alters the voltage 89 on intensity control grid 35 of the CRT 11 to intensify a spot on the displayed waveform of the input signal. The position of this bright spot represents the delay time between the start of the fast or expanded sweep (which is not displayed in the delaying sweep mode) and the start of the delaying time scale sweep which is displayed and which is synchronized to the input signal at terminal 20. The bright spot can be moved along the displayed waveform by varying the reference source 31 which is calibrated to read out directly in delay time.

The delaying trigger holdoff 37 prevents the delaying trigger circuit 13 from starting the delaying sweep generator 9 for a time equal to the lenth of the delaying sweep plus an additional interval of time to allow full recovery of all circuits. The waveform of the input signal at terminal 20 is thus displayed on an unexpanded or slow time scale and an event on the waveform selected for display on an expanded time scale may be identified by an intensified spot on the displayed waveform.

*Delayed main sweep, triggered or armed mode*

Figure 3:
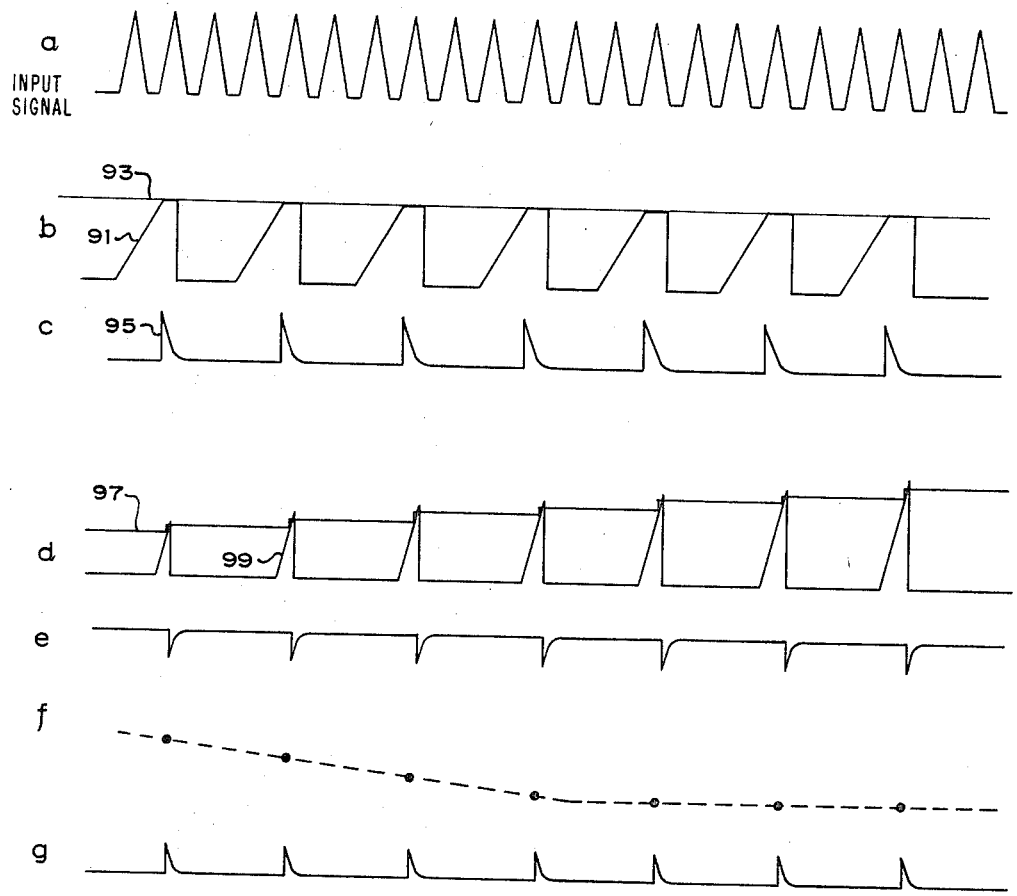
Figure 4:
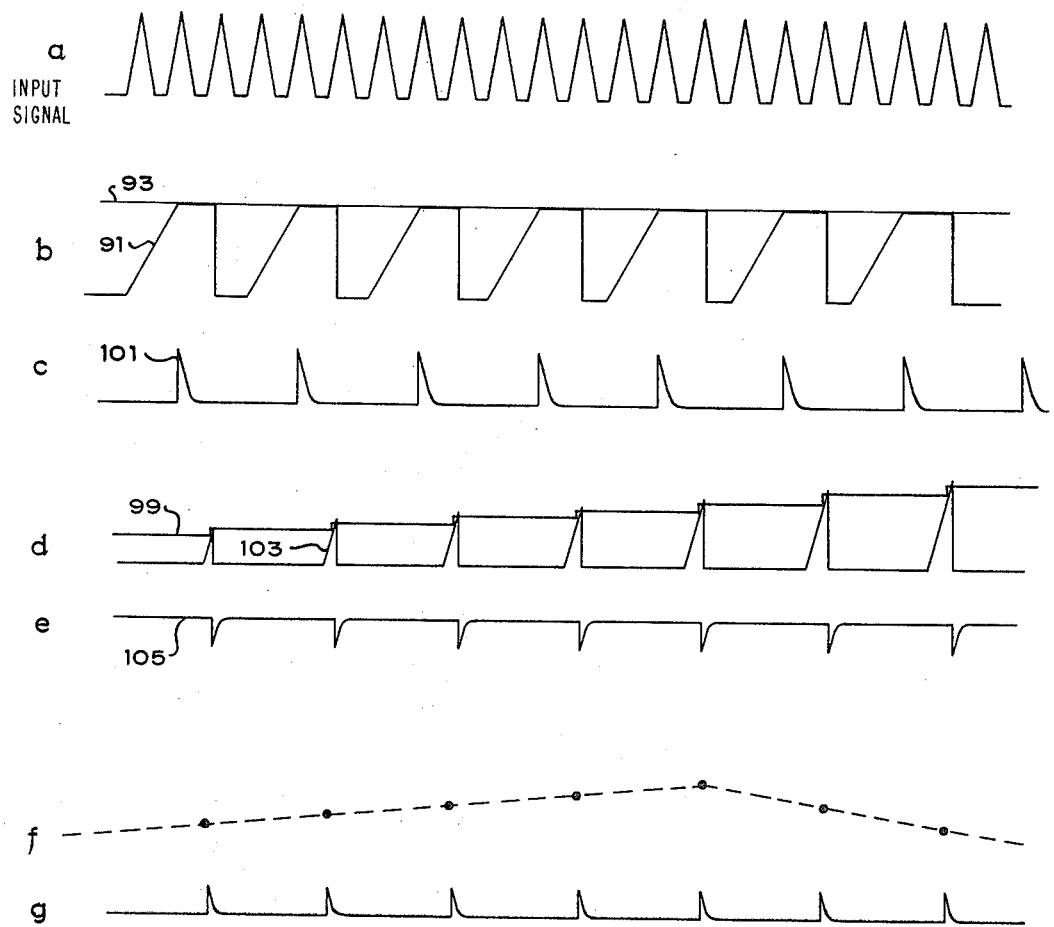

Operation in these modes is as shown in FIGURES 3 and 4 and is selected by switch 7 set to position B and with switch 41 set to position C or D. The delaying sweep generator 9 is triggered in this mode as discussed above in connection with the delaying sweep mode of operation. The delaying sweep generator 9 applies a sweep signal 91 to one input of voltage comparator 17, the other input of which receives a reference voltage 93 from source 31. Comparator 17 produces a trigger output 95 when the voltage level of the delaying sweep generator 9 is equal to the level of the reference voltage (which corresponds to a particular delay time between the start of the delaying sweep generator 9 and the event on the input signal waveform selected during the delaying sweep mode of operation). This trigger output may either initiate a sweep 99 from the main sweep generator 21 or arm the main trigger circuit 39, depending upon the setting of the trigger function switch 41. If switch 41 is set in position C for the trigger function, the main sweep generator 21 is triggered by the signal from voltage comparator 17, as shown in FIGURE 3. One input of voltage comparator 25 receives the main sweep 99 from generator 21 and the other input receives a scanning signal 97, normally a staircase waveform, from the scanner 19. When the voltage levels of these two signals are equal, voltage comparator 25 triggers the sampler 27 and the reset generator 36 (FIGURES 3e and 3g) which then resets both the main sweep generator 21 and the delay sweep generator 9 (FIGURES 3b and 3d). The sampler 27 thus produces a sample pulse indicative of the instantaneous amplitude of the input signal at terminal 20 in a manner as previously described in connection with the delaying sweep mode of operation for display on the screen of CRT 11 (FIGURE 3f).

The main sweep generator 21 generates a fast sweep that defines the time scale of the display on the CRT 11. The fast or expanded sweep is synchronized to the trigger signal generated by voltage comparator 17. The trigger signal derived from voltage comparator 17 is synchronized to the input signal at terminal 20 through delaying trigger circuit 13 and delaying sweep generator 9 as aforementioned and is delayed in time from the start of the delaying sweep by the reference voltage source 31. Hence the aforementioned selected event identified by the intensified spot is displayed on the CRT 11. Any rate jitter in the input signal will be displayed in this operating mode and may be measured precisely on the fast time scale. Further, any portion of the input signal corresponding to the time represented by the fast sweep and contained within the time represented by the slower sweep may be observed in detail by varying the reference voltage from source 31.

When the trigger function switch 41 is set to position D for the ARM function, represented by the graph of FIGURE 4, the trigger signal 101 from voltage comparator 17 arms the main trigger circuit 39 so that the selected event of the input signal subsequently appearing at the main trigger circuit input 43 will cause the main trigger circuit 39 to initiate the main sweep 103 from generator 21 and thus synchronize the fast time scale to the selected event. The fast sweep 103 from the main sweep generator 21 is applied along with the scanning signal 99 from scanner 19 to the voltage comparator 25 which triggers the sampler 27 (FIGURE 4g) for displaying the input signal (FIGURE 4f) on the CRT 11 in a manner as previously described and which also triggers reset generator (FIGURE 4e) to reset the delaying sweep generator 9 and the main sweep generator (FIGURES 4b and 4d). Because the delaying trigger circuit 13 must not start the delaying sweep generator 9 until both the delaying sweep and main sweep generators 9 and 21 have recovered, the delaying trigger and main trigger holdoff circuits 37, 45 are connected in tandem to control the delay trigger circuit 13.

In general, then, the sequence of events for the delayed main sweep mode of operation are as follows: the slow or delaying sweep 9 is initiated by the input signal waveform. A delay interval is determined by the reference level from source 31. At the end of the delay interval either the faster sweep from the main sweep generator 21 is initiated or trigger circuit 39 is armed. Once the fast sweep has been initiated, it will rise until its level is equal to the staircase waveform provided by scanner 19. At this time one sample is taken. The instantaneous amplitude of the input signal at the time that the sample is taken provides the vertical information for the position of the sample as displayed on the CRT. The horizontal position of the sample on the CRT is provided by the staircase waveform from scanner 19 which drives the horizontal deflection electrodes of the CRT 11.

The whole sequence of events is repeated for the next sample and, in this fashion, a replica of the input signal waveform is reconstructed on the CRT display. When the signal has been reconstructed across the CRT, the staircase signal is reset and the whole sequence of events is repeated so that the reconstructed input signal is repetitively displayed on the CRT 11.

Thus, any event in the waveform of the input signal selected in the delaying mode may be observed in detail on a fast or expanded time scale and, because the fast sweep is synchronized to the displayed event, any rate jitter in the input signal is eliminated when displayed in the main delayed mode of operation.

I claim:
1. A signal circuit for operation on an applied signal, the circuit comprising:
   a first generator for producing a first signal of time-varying amplitude;
   a first source of comparison signal;
   first comparator means connected to said first source and to said first generator for producing a first output when said first signal and the comparison signal from said first source bear a predetermined relationship to each other;

a second generator producing a second signal of time-varying amplitude in response to an initiating signal applied thereto;

circuit means connected to the second generator for applying initiating said signal thereto in response at least to said first output for initiating said second signal from said second generator;

a second source of comparison signal;

second comparator means connected to said second generator and to said second source for producing a second output when said second signal and the comparison signal from said second source bear a predetermined relationship to each other; and a utilization circuit connected to receive an applied signal and being responsive to said second output for producing an output signal related to the amplitude of the applied signal at the time of occurrence of said second output.

2. A signal circuit as in claim 1 wherein:

one of said first and second sources of comparison signals supplies a unidirectional signal of selected amplitude; and the other of said first and second sources of comparison signals supplies a staircase waveform.

3. A signal circuit as in claim 2 wherein:

said other of the first and second sources of comparison signals produces said staircase waveform having an amplitude which changes by a fixed value for each occurrence of said second output.

4. A signal circuit as in claim 2 wherein:

the first generator produces the first signal as a substantially linear ramp of predetermined slope in response to a selected recurrence of an applied signal; and said second generator produces the second signal as a substantially linear ramp with a slope greater than said predetermined slope of the first signal in response at least to said first output.

5. A signal circuit as in claim 2 wherein:

said circuit means includes a trigger circuit connected to receive said first output and the applied signal for initiating said second signal at a selected recurrence of the applied signal following occurrence of the first output.

6. A signal circuit as in claim 2 wherein:

the utilization circuit includes a signal sampler which receives the second output for producing a sample pulse of an applied signal at each occurrence of the second output;

display means having deflection apparatus are provided for displaying signals applied thereto along coordinate deflection axes;

means are connected to said display means for applying thereto the comparison signal having the staircase waveform for deflecting signal displayed thereby along one axis; and means are connected to said display means for applying the sample pulses thereto for deflecting signal displayed thereby along another axis.

7. A signal circuit as in claim 6 wherein:

said display means includes a cathode-ray display tube having horizontal deflection electrodes, vertical deflection electrodes and a display intensity control electrode;

means are provided for applying to the horizontal deflection electrodes a signal proportional to the comparison signal having the staircase waveform;

means are provided for applying signals proportional to said sample pulses of the applied signal to said vertical deflection electrodes;

third comparator means are connected to receive a signal proportional to the comparison signal having the staircase waveform and a reference signal for producing a third output when the signals applied thereto bear a predetermined relationship to each other; and means are connected to the intensity control electrode for applying the third output thereto to alter the intensity of the displayed signal at a selected location along a deflection axis.

References Cited

UNITED STATES PATENTS

| 2,951,181 | 8/1960 | Sugarman. | |
|---|---|---|---|
| 3,010,070 | 11/1961 | Siegel | 328—147 X |
| 3,383,548 | 5/1968 | Goodale | 315—25 |

RICHARD A. FARLEY, *Primary Examiner.*

T. H. TUBBESING, *Assistant Examiner.*

U.S. Cl. X.R.

315—25; 328—147, 148, 151

UNITED STATES PATENT OFFICE
CERTIFICATE OF CORRECTION

Patent No. 3,423,628

January 21, 1969

Allan Irving Best

It is certified that error appears in the above identified patent and that said Letters Patent are hereby corrected as shown below:

Column 3, line 33, "lenth" should read -- length --. Column 5, line 9, "applying initiating said" should read -- applying said initiating --.

Signed and sealed this 17th day of March 1970.

(SEAL)
Attest:

Edward M. Fletcher, Jr.
Attesting Officer

WILLIAM E. SCHUYLER, JR.
Commissioner of Patents